United States Patent
Dang et al.

(10) Patent No.: US 10,014,905 B2
(45) Date of Patent: Jul. 3, 2018

(54) SIGNAL PROCESSING SYSTEM AND METHOD, BASE STATION AND USER EQUIPMENT

(71) Applicant: Sony Corporation, Tokyo (JP)

(72) Inventors: Jian Dang, Nanjing (CN); Zaichen Zhang, Nanjing (CN); Yu Shi, Nanjing (CN); Chao Wei, Nanjing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/214,610

(22) Filed: Jul. 20, 2016

(65) Prior Publication Data

US 2017/0033832 A1 Feb. 2, 2017

(30) Foreign Application Priority Data

Jul. 31, 2015 (CN) .......................... 2015 1 0463339

(51) Int. Cl.
*H04L 25/02* (2006.01)
*H04B 1/7103* (2011.01)
*H04L 1/00* (2006.01)
*H04B 7/06* (2006.01)

(52) U.S. Cl.
CPC ......... *H04B 1/7103* (2013.01); *H04B 7/0678* (2013.01); *H04L 1/00* (2013.01); *H04L 1/0071* (2013.01); *H04L 25/0256* (2013.01); *H04B 2201/709709* (2013.01)

(58) Field of Classification Search
CPC ................ H04B 1/7103; H04B 7/0678; H04B 2201/709709; H04L 25/0256; H04L 1/00; H04L 1/0071
See application file for complete search history.

(56) References Cited

U.S. PATENT DOCUMENTS

| | | | | |
|---|---|---|---|---|
| 6,728,295 B1* | 4/2004 | Nallanathan | ........ | H04J 13/0048 370/208 |
| 8,548,027 B2* | 10/2013 | Zeng | ................... | H03M 13/134 370/320 |
| 8,873,458 B2* | 10/2014 | Lee | ....................... | H04W 52/42 370/318 |
| 9,130,734 B1* | 9/2015 | Jones | ..................... | H04L 1/0071 |
| 9,319,166 B2* | 4/2016 | Khoryaev | ............. | H04L 1/0057 |
| 2004/0028004 A1* | 2/2004 | Hayashi | ............... | H04B 1/7103 370/320 |
| 2006/0039271 A1* | 2/2006 | Li | ....................... | H04W 52/262 370/208 |
| 2009/0132872 A1* | 5/2009 | Leung | .................. | H03M 13/27 714/701 |
| 2010/0146363 A1* | 6/2010 | Birru | ..................... | H04L 1/0043 714/752 |
| 2010/0323612 A1* | 12/2010 | Xu | ......................... | H04B 7/022 455/7 |

(Continued)

*Primary Examiner* — Kenneth Lam

(74) *Attorney, Agent, or Firm* — Oblon, McClelland, Maier & Neustadt, L.L.P.

(57) ABSTRACT

The present disclosure provides a signal processing system and method for a non-orthogonal multiple access communication system, a base station and a user equipment. The signal processing system is configured to perform interleaving processing on information to be transmitted subjected to modulation processing. The signal processing system can obtain at least one of the following beneficial effects: capable of saving length of an interleaver; and capable of obtaining more diversity gain.

8 Claims, 14 Drawing Sheets

(56) References Cited

U.S. PATENT DOCUMENTS

| | | | |
|---|---|---|---|
| 2011/0243197 A1* | 10/2011 | Atarashi | H04B 1/692 375/146 |
| 2015/0381318 A1* | 12/2015 | Zhang | H04L 1/0071 370/335 |
| 2016/0112158 A1* | 4/2016 | Popovic | H03M 13/2707 370/330 |
| 2016/0127085 A1* | 5/2016 | Kim | H03M 13/23 370/329 |

\* cited by examiner

SIGNAL PROCESSING SYSTEM AND METHOD, BASE STATION AND USER EQUIPMENT

FIELD

The embodiments of the disclosure generally relate to the technical field of radio communication, and in particular to a signal processing system, signal processing method, base station and user equipment for a non-orthogonal multiple access communication system.

BACKGROUND

In the field of radio communication, one of the core techniques in a physical layer of a communication network is a multiple access (MA) technique, which defines a fashion for simultaneous communication between multiple users. Each of the users will occupy a certain time-frequency resource in communication. According to different resource allocation fashions, the MA techniques may be classified into an orthogonal MA (OMA) technique and a non-orthogonal MA (NOMA) technique. In a certain multiple user communication system, if the time-frequency resources occupied by any two of the users are not overlapped, it is considered that the communication system uses the OMA technique. Otherwise, it is considered that the communication system uses the NOMA technique. For example, in a first generation mobile communication system, a frequency division MA (FDMA) technique is mainly adopted. That is, an available frequency band may be divided into several sub-frequency bands which are not mutually overlapped, and in communication, different sub-frequency bands may be allocated to different user for occupation. Thus, from the point of the division of the time-frequency resource, the resources occupied by any two users in FDMA are not overlapped mutually, which is a typical OMA technique. Other typical OMA techniques include a time division MA (TDMA) technique and a orthogonal FDMA (OFDMA) technique.

Interleaving is an operation for a vector, that is, an operation to rearrange elements in the vector in a certain rule to obtain a new vector with an unchanged length. De-interleaving is an inverse process of the interleaving. An interleaver is a module to carry out the interleaving operation, an input and an output of which are vectors with equal lengths.

At first, the interleaving is used in channel coding and decoding. Generally, for a string of coded bits with errors, if these errors are dispersed discretely, these errors may be corrected by using an error correcting code with a larger probability, and if there errors are dispersed continuously, the error correcting performance will be decreased significantly when using the error correcting code. Therefore, at a transmitting end, the coded bits may be interleaved, and when passing through the channel, errors may be generated on certain several continuous bits. At a receiving end, after de-interleaving, these continuous errors are dispersed, thereby facilitating channel decoding. In the channel coding and decoding, interleavers used by different users are generally completely the same. Then, it is discovered by the researcher that, if different users use different interleavers, signals from different users may be correctly detected at the receiving end by designing carefully a detection algorithm at the receiving end. Thus, an interleave division MA (IDMA) techniques is formed, which has a general structure as follows: signals from each user are coded in a lower speed, generally using repetition coding (which may also be referred to as spreading in this case), and then an interleaver is provided, which is different from those of other users.

In IDMA, all users occupy all of the time-frequency resources which are completely overlapped. IDMA is a typical prospective NOMA technique. As compared with other MA techniques, such as frequency division multiple access (FDMA), orthogonal frequency division multiple access (OFDMA) and code division multiple access (CDMA), IDMA has advantages of high power efficiency and low decoding complexity, and is expected to be applied in a next generation of radio communication system. The high power efficiency of IDMA is determined by its non-orthogonality, and is achieved by a user-wise power allocation. The low decoding complexity of IDMA is ensured by slice-wise detection algorithm adopted by the receiving terminal. To further reduce the complexity and compensate for channel fading, the orthogonal frequency division multiplexing (OFDM) technique and the interleave division multiple access (IDMA) technique may be combined, to form an OFDM-IDMA communication system, which has the advantages of the OFMD system and the IDMA system, and thus becomes a better candidate multiple access solution for the next generation mobile communication system.

However, it has become a new challenge for those skilled in the art how to further improve transmission performance of the NOMA communication system.

SUMMARY

In view of the above described current situation of the conventional art, it is desired to provide a technical solution capable of improving transmission performance of a non-orthogonal multiple access communication system.

A brief summary of the disclosure will be given hereinafter, so as to provide basic understanding of some aspects of the disclosure. It is to be understood that, this summary is not an exhaustive summary of the disclosure. It is neither intended to determine a key or important part of the disclosure, nor intended to define the scope of the disclosure. It is only intended to give some concepts in a simplified form, to serve as a preface of more detailed description discussed later.

In an aspect of the disclosure, it is provided a signal processing system for a non-orthogonal multiple access communication system, the signal processing system being configured to perform interleaving processing on information to be transmitted which has been subjected to modulation processing.

In another aspect of the disclosure, it is further provided a user equipment for a non-orthogonal multiple access communication system, the user equipment including: the signal processing system as described above.

In another aspect of the disclosure, it is further provided a base station for a non-orthogonal multiple access communication system, where the base station is used to, upon receipt of a data connection request from a user equipment, generate information of a spread sequence with a length longer than a predetermined threshold and transmit the information of the spread sequence to the user equipment, so that the user equipment spreads information to be transmitted using the spread sequence, and makes the spread sequence overlapping such that an effective spread spectrum length is increased.

In another aspect of the disclosure, it is further provided a signal processing system for a non-orthogonal multiple access communication system, configured to receive and detect continuous signals transmitted by user equipments, the signal processing system comprising: a modeling unit, for modeling extrinsic information of the continuous signals transmitted by each user equipment to be a continuous signal whose characteristics can be represented by an average value and variance based on the received continuous signals, so as to achieve detection of the continuous signals transmitted by said each user equipment.

In another aspect of the disclosure, it is further provided a base station for a non-orthogonal multiple access communication system, the base station comprises: the signal processing system as described above.

In another aspect of the disclosure, it is further provided a signal processing method for a non-orthogonal multiple access communication system, comprising: performing interleaving processing on information to be transmitted which has been subjected to modulation processing.

In another aspect of the disclosure, it is further provided a signal processing method for a non-orthogonal multiple access communication system, wherein the signal processing method is configured for receiving and detecting continuous signals transmitted by a plurality of user equipments, and the signal processing method comprises: modeling extrinsic information of the continuous signals transmitted by each user equipment to be a continuous signal whose characteristics can be represented by an average value and variance based on the received continuous signals, so as to achieve detection of the continuous signals transmitted by said each user equipment.

In another aspect of the disclosure, it is further provided a signal processing method for a non-orthogonal multiple access communication system, comprising: transmitting, by a user equipment, a data connection request to a base station; in response to the data connection request transmitted by the user equipment, with respect to each user equipment, generating information of a spread sequence with a length longer than a predetermined threshold and transmitting the information of the spread sequence and a reply request to the user equipment, by the base station; and after receiving the information of the spread sequence from the base station, transmitting, by the user equipment, information to be transmitted as uplink data together with training sequences to the base station, wherein the user equipment spreads the information to be transmitted using the spread sequence, and makes the spread sequence overlapping such that an effective spread spectrum length is increased.

In another aspect of the disclosure, it is further provided a communication system, including the user equipment as described above and the base station as described above.

In other aspects of the disclosure, it is further provided a computer program code and computer program product for implementing the above method for signal processing and a computer readable storage medium on which the computer program code for implementing the above method for signal processing is recorded.

The device, method and system according to the disclosure have for example at least one of the following beneficial effects: capable of saving length of an interleaver; and capable of obtaining more diversity gain.

The above and other advantages of the disclosure will become more apparent in view of the detail description of the preferred embodiments of the disclosure in conjunction with the drawings.

BRIEF DESCRIPTION OF THE DRAWINGS

In order to further describe the above and other advantages and features of the disclosure, specific embodiments of the disclosure will be described in detail hereinafter in conjunction with the drawings. The element with the same function and structure will be denoted with the same reference numeral. It is to be understood that, these drawings only describe typical examples of the disclosure, but should not be deemed as limiting to the scope of the disclosure. In the drawings.

DETAILED DESCRIPTION OF EMBODIMENTS

Figure 1:
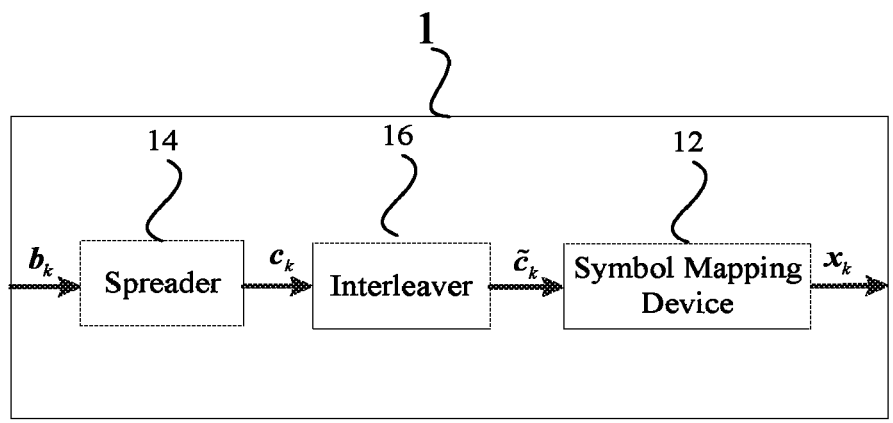
FIG. 1 is a block diagram showing a transmitting end of a user equipment in a conventional non-orthogonal multiple access communication system.

Hereinafter, the demonstrative embodiments of the disclosure will be described in conjunction with the drawings. For clarity and brief, not all the features of the practical embodiments are described in the specification. However, it is to be understood that, many decisions specific to the embodiment must be made during the development of any one of the practical embodiments, so as to achieve the specific object of the developer, for example, coinciding with limiting conditions related to the system and service, and possibly changing the limiting conditions with different embodiments. Moreover, it is to be understood that, although the developing work may be very complicated and time-consuming, but is only a routine task for those skilled in the art benefit from the disclosure.

It is further to be noted here that, to avoid obscuring the disclosure due to unnecessary details, only the device structure and/or processing step closely related to the solution of the disclosure are shown in the drawings, and other details less related to the disclosure are omitted To give the description clearly, the various specific embodiments of the disclosure will be described by taking an OFDM-IDMA communication system as a specific application scene of a non-orthogonal multiple access communication system. However, it is to be understood by those skilled in the art that, in addition to the OFDM-IDMA communication system, the technical solution configured according to the embodiment of the disclosure is applicable to various other non-orthogonal multiple access communication systems, such as SC-FDMA-IDMA and SCMA.

FIG. 1 is a block diagram showing a transmitting end of a user equipment in a conventional non-orthogonal multiple access communication system.

As shown in FIG. 1, in the conventional non-orthogonal multiple access system, a signal processing system 1 at a transmitting end of a user equipment is generally provided with a spreader 14, an interleaver 16 and a symbol mapping device 12 in sequence.

As shown in FIG. 1, an information bit vector $b_k$ (i.e., information to be transmitted) with a length of $N_b$ is firstly inputted into the spreader (where $N_b$ indicates the number of information bites transmitted by a user, i.e., the number of bites contained in the information bit vector $b_k$), so as to obtain a spread slice $c_k$. The spread sequence is an alternate sequence of $\{+1, -1\}$ with a length of S. For example, when S=4, the spread sequence is $s=[+1, -1, +1, -1]^T$, and when S=8, the spread sequence is $s=[+1, -1, +1, -1, +1, -1, +1, -1]^T$. The slice $c_k$ is then interleaved by the interleaver, to obtain an interleaved vector $\tilde{c}_k$. For a different user, the interleaver is different. Generally, for better fitting the practical application circumstance, the design of the interleaver should follow two rules: (1) weak correlation between interleavers of different users; and (2) interleaver generation with simple process and less system resource. For this purpose, during the development, a random interleaver is adopted, and an interleaver is generated randomly for each user for use (that is, different users have different interleavers). It can be seen in the literatures that, the random interleaver has better performance and thus is most commonly used. The interleaver is the only identifier for the system to identify the user. Then, $\tilde{c}_k$ is modulated by for example, QPSK, to obtain a modulated vector $x_k$ with a length of N. And finally, $x_k$ is transmitted directly, or is converted into multiple carrier IDMA by OFDM modulation and then transmitted.

As shown in FIG. 1, in the conventional IDMA system, the length of the interleaver is the length of the slice $c_k$ of the information to be transmitted that has been spread by the spreader.

According to the disclosure, it is provided a signal processing system for a non-orthogonal multiple access communication system, the signal processing system is configured to perform interleaving processing on information to be transmitted which has been subjected to modulation processing, so as to save a length of the interleaver.

According to an embodiment of the disclosure, the saving of the length of the interleaver may be implemented by providing the symbol mapping device ahead of the interleaver.

Figure 2:
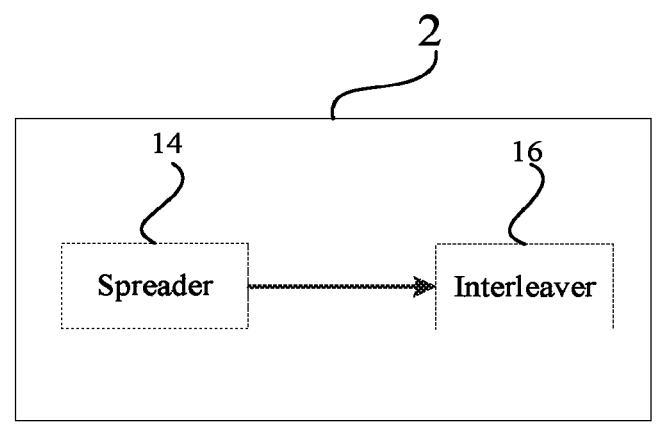
FIG. 2 is a schematic block diagram showing a signal processing system according to the disclosure.

FIG. 2 is a schematic block diagram showing a signal processing system according to the disclosure. As shown in FIG. 2, the signal processing system 2 according to the disclosure may include: a symbol mapping device 22 for performing modulation processing on the information to be transmitted; and an interleaver 26 for performing interleaving processing on the information to be transmitted which has been subjected to modulation processing, so as to save a length of the interleaver.

Figure 3:
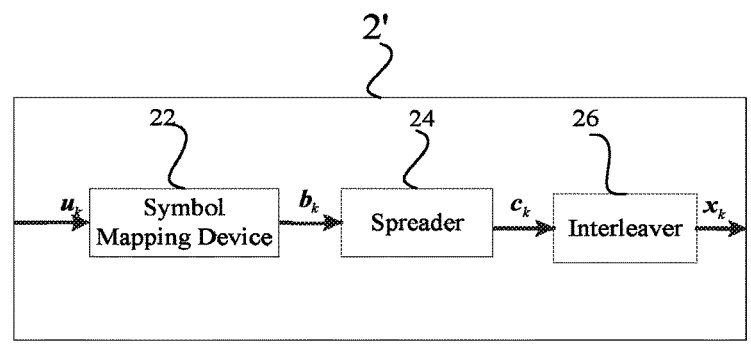
FIG. 3 shows a schematic block diagram of an example of a signal processing system 2 for a non-orthogonal multiple access communication system according to an embodiment of the disclosure.

FIG. 3 shows a schematic block diagram of an example of a signal processing system 2 for a non-orthogonal multiple access communication system according to an embodiment of the disclosure.

As shown in FIG. 3, the signal processing system 2' includes: a symbol mapping device 22 for performing modulation processing on the information to be transmitted; a spreader 24 for spreading the information to be transmitted which has been processed by the symbol mapping device 22, and transmitting the spread information to be transmitted to the interleaver 26 to perform interleaving processing; and an interleaver 26 for performing interleaving processing on the information to be transmitted which has been subjected to modulation processing, so as to save a length of the interleaver.

The specific transmission steps of the signal processing system 2' will be described hereinafter in conjunction with FIG. 3. An information bit vector $u_k$ (i.e., the information to be transmitted) is inputted into the symbol mapping device to generate a symbol vector $b_k$. Then, the symbol vector $b_k$ is inputted into the spreader to spread to obtain a spread slice $c_k$. And then the slice $c_k$ is interleaved by the interleaver to obtain an interleaved vector $x_k$. Finally, the vector $x_k$ is inputted into a channel for transmission.

Since the symbol mapping device is provided ahead of the interleaver, the length of the information bit vector $u_k$ which is the information to be transmitted after the modulation by the symbol mapping device (for example, with a modulation order being M) become 1/M of its original length (that is, the length of the vector before being inputted into the interleaver is reduced as 1/M of the length of the interleaver in the conventional signal processing system at the transmitting end), and thus the length of the interleaver can be reduced as 1/M of the length of the interleaver in the conventional signal processing system.

For example, in the conventional non-orthogonal multiple access communication (IDMA) system (as shown in FIG. 1), assuming that the length of the information bit vector bk of the information to be transmitted is 2 bits, the length of the information bit vector bk after being spread by the spreader (a 2-bit spreader) becomes 4 bits, so as to be interleaved using an interleaver with a length of 4 bits. In the signal processing system as shown in FIG. 3, since the symbol mapping device is provided ahead of the spreader, the length of the information bit vector $u_k$ with a length of 2 bits becomes 1 bit after the modulation (such as QPSK modulation, with a modulation order being 2) by the symbol mapping device, and then becomes 2 bits after the spreading by the spreader, so as to be interleaved using an interleaver with a length of 2 bits. Therefore, as compared with the conventional signal processing system, the signal processing system according to the disclosure can save the length of the interleaver. Specifically, the length of the interleaver in the signal processing system according to the disclosure can be reduced as 1/M of that in the conventional IDMA system, where M is the modulation order of the symbol mapping device.

Figure 4:
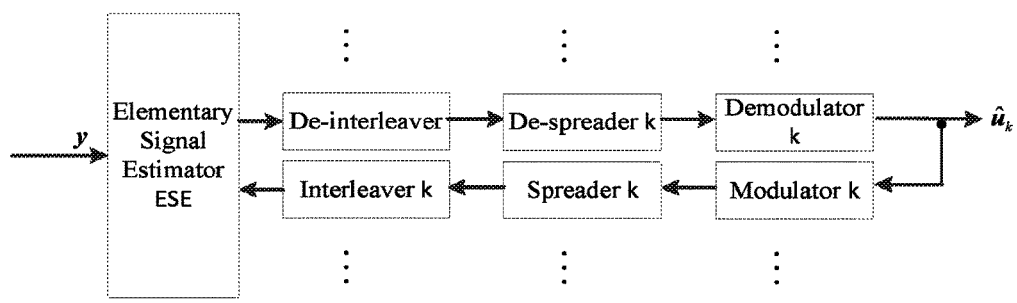
FIG. 4 shows a schematic block diagram of an example of a signal processing system located at a receiving end which corresponds to the signal processing system of FIG. 3 located at a transmitting end.

Correspondingly to the signal processing system of FIG. 3 located at a transmitting end, FIG. 4 shows a signal processing system located at a receiving end.

Figure 5:
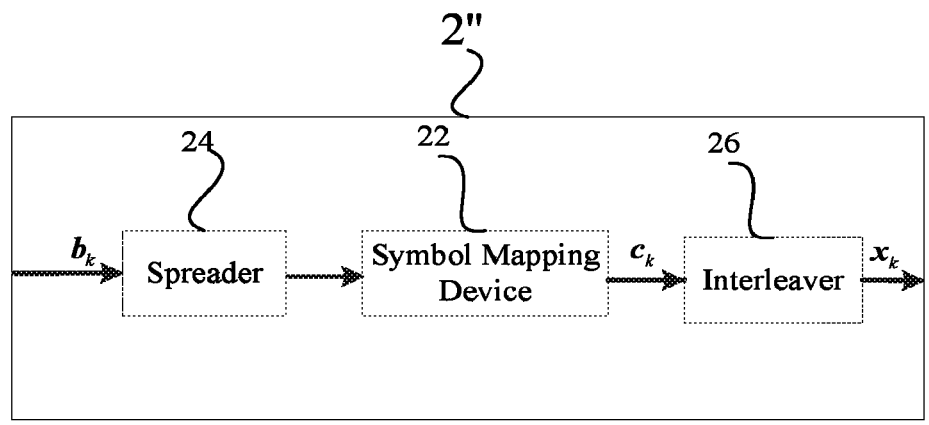
FIG. 5 shows a schematic block diagram of another example of a signal processing system 5 for a non-orthogonal multiple access communication system according to an embodiment of the disclosure.

As compared with the conventional signal processing system located at a receiving end, as shown in FIG. 4, positions of a demodulator, a de-spreader and a deinterleaver are adjusted with respect to positions of the symbol mapping device, the spreader and the interleaver in the signal processing system located at the transmitting end. It can be understood by those skilled in the art that, this adjustment is based on adjustments of positions of various components at the transmitting end, and thus detailed description thereof is omitted here. FIG. 5 shows a schematic block diagram of another example of a signal processing system 5 for a non-orthogonal multiple access communication system according to an embodiment of the disclosure.

As shown in FIG. 5, a signal processing system 2" includes: a spreader 24 for spreading the information to be transmitted; a symbol mapping device 22 for performing modulation processing on the spread information to be transmitted, and transmitting the information to be transmitted which has been subjected to modulation processing to the interleaver to perform interleaving processing; and an interleaver 26 for performing interleaving processing on the information to be transmitted which has been subjected to modulation processing.

The specific transmission steps of the signal processing system 2" will be described hereinafter in conjunction with FIG. 5. An information bit vector $u_k$ (i.e., the information to be transmitted) is inputted into the spreader 24 to spread to obtain a spread slice. Then, the spread slice is inputted into the symbol mapping device 22 to modulate to obtain a modulated spread slice $c_k$. And then the slice $c_k$ is interleaved by the interleaver 26 to obtain an interleaved vector $x_k$. Finally, the vector $x_k$ is inputted into a channel for transmission.

Similar to the signal processing system shown in FIG. 3, since the symbol mapping device 22 is provided ahead of the interleaver 26, the length of the interleaver is saved as compared with the conventional signal processing system. From the point of hardware storage, no matter being located at the user end or the base station end, the shorter the length of the interleaver is, the smaller the size of the needed storage unit is, and thus saving in the length of the interleaver is benefit to saving hardware resources. And from the point of information interaction, since the base station transmits the information from the interleaver to the user, the shorter the length of the interleaver is, the less the time-frequency resources occupied by the signaling interaction is, and thus saving in the length of the interleaver is benefit to saving communication power consumption.

For the signal processing system according to the disclosure as shown in FIG. 5, it is apparent to those skilled in the art that, positions of the demodulator, the de-spreader and the deinterleaver in the signal processing system located at the receiving end may be adjusted correspondingly based on the positions of the symbol mapping device, the spreader and the interleaver in the signal processing system located at the transmitting end, which is well-known in the art and thus will not be described here. As an example, if the symbol mapping device, the spreader and the interleaver are provided in the signal processing system located at the transmitting end in this order, the demodulator, the de-spreader and the deinterleaver are provided correspondingly after the elementary signal estimator in the signal processing system located at the receiving end in this order, as shown in FIG. 3 and FIG. 4. As another example, if the spreader, the symbol mapping device and the interleaver are provided in the signal processing system located at the transmitting end as shown in FIG. 5 in this order, the de-spreader, the demodulator and the deinterleaver are provided correspondingly after the elementary signal estimator in the signal processing system located at the receiving end in this order.

In the conventional art, the spreader adopted in the conventional system is based on a binary vector, in which an alternate sequence {+1, −1} with a length of S is taken as the spread sequence, such as S=[+1, −1, +1, . . . , −1]$^T$. Since the spreading length of the spreader in the conventional art is limited, it is further proposed in the disclosure to spread the sequence to be transmitted using a spreader with a spread sequence having an increased length.

According to an embodiment of the disclosure, the signal processing system is further configured to spread the information to be transmitted using a spread sequence with a length longer than a predetermined threshold, and cause the sequence after spreading overlapping such that an effective spread spectrum length is increased.

According to the disclosure, assuming that the information to be transmitted has a length of a-bit and b-bit, and after 2-multiple spreading by a 2-bit spreader, respectively becomes +a, −a, and +b, −b. In the conventional solution, the spread sequences do not overlapped, and then the signals to be transmitted are +a, −a, +b. −b (here, not considering affection of the interleaver on the order of the symbols), which occupy 4 time slots totally. In the disclosure, the overlapping is allowed, a 4-multiple spreading may be adopted, and the spread signals are respectively +a, −a, +a, −a, and +b, −b, +b, −b, the overlapped signals are +a+b, −a−b, +a+b, −a−b, which still occupy 4 time slots, with spreading length of each bit changing from 2 to 4, Thus, the configuration of the signal processing system according to the disclosure is more benefit to obtaining diversity gain.

According to a preferred embodiment of the disclosure, the signal processing system is configured to spread the information to be transmitted using a full spreader, so that each information bit is spread into more symbols, thereby obtaining more diversity gain.

Figure 6:
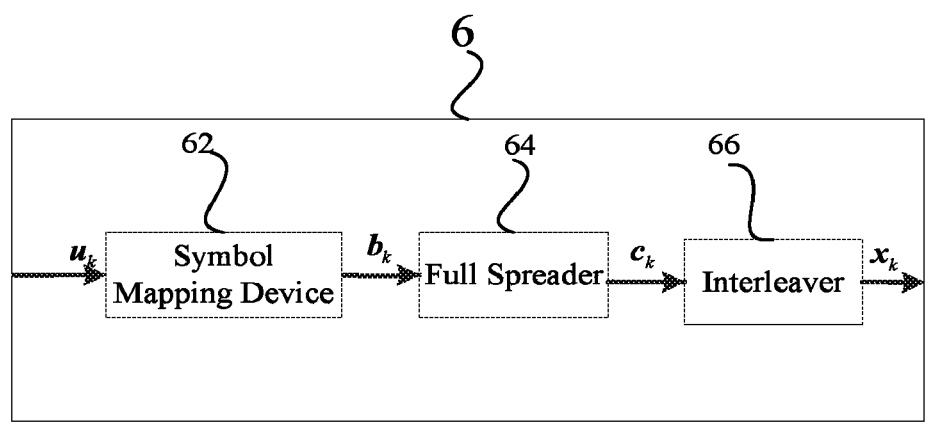
FIG. 6 shows a block diagram of an exemplary configuration of a signal processing system using a full spreader as a spreader.

FIG. 6 shows a block diagram of an exemplary configuration of a signal processing system using a full spreader as a spreader.

As shown in FIG. 6, the signal processing system 6 includes: a symbol mapping device 62 for performing modulation processing on the information to be transmitted; a full spreader 64 for spreading the information to be transmitted which has been processed by the symbol mapping device 62 using a full spreading matrix, and transmitting the spread information to be transmitted to the interleaver 66 to perform interleaving processing; and an interleaver 66 for performing interleaving processing on the information to be transmitted which has been subjected to modulation processing. Except for replacing the conventional spreader 24 with the full spreader 64, other components included in the signal processing system 6 and corresponding processes thereof are similar to those in the signal processing system 2' shown in FIG. 3.

More specifically, the specific transmission steps of the signal processing system 6 shown in FIG. 6 are as follows. An information bit vector $u_k$ (i.e., the information to be transmitted) is inputted into the symbol mapping device 62 to generate a symbol vector $b_k$. Then, the symbol vector $b_k$ is inputted into the full spreader 64 to spread to obtain a spread slice $c_k$. And then the slice $c_k$ is interleaved by the interleaver 66 to obtain an interleaved vector $x_k$. Finally, the vector $x_k$ is inputted into a channel for transmission. Since lengths of $x_k$ and $c_k$ each is N, the full spreader may be moduled as a matrix mathematically, i.e., $S=[s_{11}, s_{12}, \ldots]$, where $s_{11}, s_{12}$ and the like each is a spread sequence with a length of N.

The above full spreading structure of the IDMA communication system is different from the conventional IDMA system structure in that, the spreader in the conventional system structure is based on a binary vector, and takes an alternate sequence $\{+1, -1\}$ with a length of S as the spread sequence, such as $s=[+1, -1, +1, \ldots, -1]^T$, and thus the spreading matrix S may be denoted as:

$$S = \begin{bmatrix} s & 0 & \ldots & 0 \\ 0 & s & \ldots & 0 \\ \vdots & \vdots & \ddots & \vdots \\ 0 & 0 & \ldots & s \end{bmatrix}$$

In the matrix S, most of the elements are 0, and only a small part of the elements are non-zero element, and thus the matrix S is referred to as a sparse matrix. It can be further seen that, the non-zero elements of the matrix S is selected from the binary numbers +1, -1, and thus the matrix S is referred to as a sparse binary matrix.

The full spreading matrix adopted by the full spreader according to the disclosure is a full matrix, i.e., non-binary and non-sparse matrix, and thus the bit information of the user can be spread fully. For example, based on the DFT/IDFT matrix or the Hadamard matrix, some of the column vectors of the DFT/IDFT matrix or the Hadamard matrix may be selected to form a full spreading matrix.

According to an embodiment of the disclosure, the full spreading matrix $S=[s_{11}, s_{12}, \ldots]$ is different from the conventional spreading matrix in that: 1, Some or all of the elements of the full spreading matrix may be non-zero values; 2, the non-zero elements are not limited to be binary; 3, no orthogonal relation is needed between the column vectors of the full spreading matrix; and 4, the number of the columns of the full spreading matrix may be changed with the user (the number of the columns of the full spreading matrix is direct proportional to the data rate of the user, the more the number of the columns is, the higher the data rate is, and in the disclosure, the user is allowed to adopt different numbers of the columns based on its data transmission requirement, thereby obtaining more flexible system configuration).

With the full spreading matrix with the above feature, each information bit is spread into more symbols, so as to obtain more diversity gain, and the data rate of the user can be adjusted separately depending on the transmission requirement of the user.

For clear description, in the above and subsequent examples described in the disclosure, the specific application scene is the OFDMA-IDMA communication system, which is not limited thereto. As described above, the technical solution according to the embodiment of the disclosure may also be applicable in other non-orthogonal multiple access communication system, as long as such a system has the feature of capable of sharing the same resource block by multiple user equipments.

According to an embodiment of the disclosure, the signal processing system described above referring to FIGS. 2-3 and 5-6 may be applicable in the user equipment located on the transmitting end of the non-orthogonal multiple access communication system, so that the user equipment transmits the uplink transmission data to the base station using this signal processing system.

Correspondingly to the user equipment including the information processing system according to the embodiment of the disclosure, it is further provided, according to the disclosure, a base station for a non-orthogonal multiple access communication system. The base station for the non-orthogonal multiple access communication system according to an embodiment of the disclosure is configured to, upon receipt of a data connection request from a user equipment, generate information of a spread sequence with a length longer than a predetermined threshold and transmit the information of the spread sequence to the user equipment, so that the user equipment spreads information to be transmitted using the spread sequence, and makes the spread sequence overlapping such that an effective spread spectrum length is increased.

According to a preferred embodiment of the disclosure, the base station is configured to generate information of the full spreading matrix, and transmit the information of the full spreading matrix to the user equipment, so that the user equipment spreads information to be transmitted using the full spreading matrix, and each information bit is spread into more symbols, thereby obtaining more diversity gain.

Further, the above full spreading structure of the DMA communication system according to the disclosure is further different from the conventional DMA system structure in that, the output signal on the transmitting end is discrete or continuous. In the conventional IDMA system, the calculation of the log-likelihood ratio (LLR) on the receiving end is based on the binary discrete signal, but the signal generated by the user equipment using the full spreader in the disclosure is continuous, and thus a new detection method is desired. For this, it is provided, according to the disclosure, a signal processing system for a non-orthogonal multiple access communication system, for receiving signals transmitted by user equipments that have been spread by the full spreader.

Figure 7:
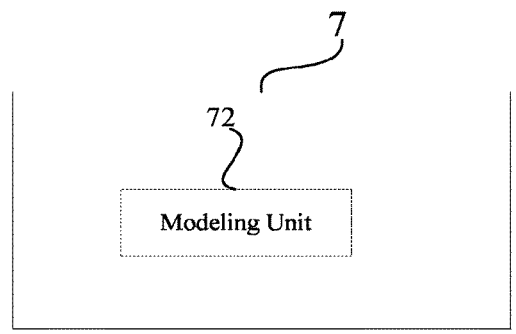
FIG. 7 is a block diagram showing a signal processing system for receiving a signal transmitted by a transmitting end according to the disclosure.

FIG. 7 is a block diagram showing a signal processing system located on the side of the base station for receiving a signal transmitted by a transmitting end according to the disclosure.

As shown in FIG. 7, the signal processing system 7 includes a modeling unit 72 for modeling extrinsic information of the continuous signals transmitted by each user equipment to be a continuous signal whose characteristics can be represented by an average value and variance based on the received continuous signals, to achieve detection of the continuous signals transmitted by said each user equipment.

Each random variable (for example, the transmission symbol of the information to be transmitted may be considered as a random variable) has priori information, which is determined based on the structure of the signal. Upon conservation of one implementation of the random variable (for example, the transmission symbol after the channel becomes a reception signal with a determined value), posteriori information of the random variable may be calculated based on the priori information and the implementation information. The posteriori information describes the random variable more accurately than the priori information. However, in the receiver based on the iteration idea, the posteriori information is not fed back directly principle, since the posteriori information contains the priori information, which will cause error propagation. In practice, what is fed back is the rest part of the posteriori information in which the priori information has been removed, which information is referred to as extrinsic information.

In practice, since the signal transmitted by the user equipment with the full spreader according to the disclosure is more approximate to the Gaussian distribution, thus according to the disclosure, the modeling unit 72 is preferably configured to model the extrinsic information of the continuous signals transmitted by each user equipment to be a Gaussian signal.

Since the signal spread with the full spreading matrix is a continuous signal, the mutual information is the maximum when the symbols input into the channel has the continuous Gaussian distribution based on the information theory, that is, the transmission rate is most approximate the channel capacity. The spread signal here is just the continuous signal having the Gaussian distribution, which is capable of utilizing the channel resources fully. Since the signal has the Gaussian distribution, the calculation of the extrinsic information is simple. While in the case of the non-binary discrete symbols, the calculation of the extrinsic information is very difficult.

The continuous signals transmitted by multiple user equipments received by the signal processing system 7 according to the disclosure may be the transmission information transmitted by the signal processing system described above referring to FIG. 6. That is, according to the disclosure, the continuous signals transmitted by the multiple user equipments are continuous signals transmitted by user equipments which make use of a full spreader to perform spreading operation, where the full spreader is configured to spread information to be transmitted using the full spreader, so that each information bit is spread into more symbols, thereby obtaining more diversity gain.

According to an embodiment of the disclosure, the modeling unit 72 is configured to model the continuous signals x transmitted by said each user equipment to be a Gaussian random variable, use prior information of x as a known condition, acquire post prior information of x according to an MMSE estimation algorithm, and then acquire the average value and variance of the extrinsic information of x using the prior information and the post prior information of x.

More specifically, the modeling unit 72 is configured to acquire the average value and variance of the extrinsic information of x according to the average value and covariance matrix of the prior information of x, a channel status information matrix of the user equipments, and a covariance matrix of a sum of noise and multiple-user interferences.

Figure 8:
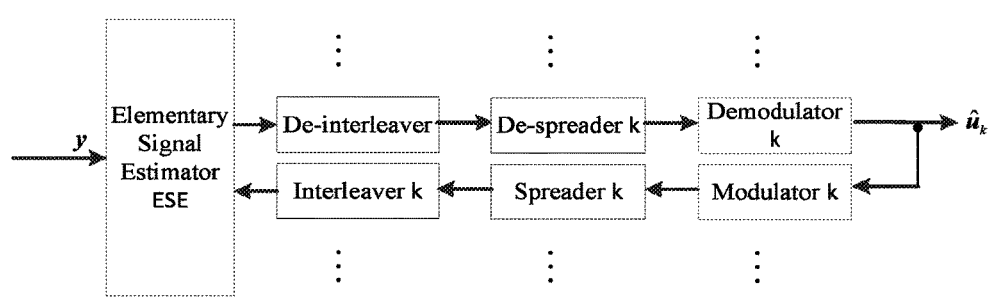
FIG. 8 is a structural block diagram of a receiving end in an IDMA communication system according to a specific example of the disclosure.

FIG. 8 is a structural block diagram of a receiving end in an IDMA communication system according to a specific example of the disclosure. According to the disclosure, the receiving end is capable of receiving and processing transmission signals transmitted by all the K active user equipments managed by the receiving end.

It is to be noted here that, the de-interleaver k, the de-spreader k, the spreader k and the interleaver k only for the k-th user equipment among all the K user equipments included in the receiving end of the base station are shown in FIG. 8, and it is to be understood by those skilled in the art that the de-interleaver, the de-spreader, the spreader and the interleaver for each of the K user equipments are included in the receiving end of the base station. To make the drawings clear and concise, the de-interleaver, the de-spreader, the spreader and the interleaver for other of the K user equipments than the k-th user equipment are shown in a form apostrophe.

As shown in FIG. 8, the reception signal y is inputted into the elementary signal estimator (ESE). The ESE functions to decompose the multi-user signal, and includes the modeling unit 72 according to the embodiment of the disclosure. The reception signal may be represented by using the following formula (1):

$$y = \sum_{k=1}^{K} H_k P_k S b_k + \eta, \tag{1}$$

Where $H_k$ and $P_k$ are respectively a channel status information matrix and an interleave matrix of the user k among all the K active users, $\eta$ is the channel noise vector, and S is the spreading matrix used by the spreader. With the iterative interference elimination technique, the elementary signal estimator decomposes the reception signal into separate signals for respective users. For the user k, the reception signal y may be re-represented by using the following formula (2)

$$y = H_k P_k S b_k + \sum_{\substack{l=1 \\ l \neq k}}^{K} H_l P_l S b_l + \eta = H_k P_k S b_k + z_k, \tag{2}$$

Where $z_k$ is a sum of noise and other-user interferences. In detection of the transmission data of the user k, $P_k S b_k$ is considered as a whole, and is represented as $x_k$, then the above formula (2) is equivalent to the vector signal model represented by the following formula (3):

$$y = Hx + z, \tag{3}$$

Where x is a continuous random variable (the above formula is a common model, and the subscript k is omitted), and z is an interference item of a known average and a covariance matrix. By using the corresponding mathematical tool, such as the MMSE estimation algorithm, the posteriori average value and variance of x are calculated. Since the extrinsic information of x is practically transmitted during the iteration of the receiver, the extrinsic information of x is calculated based on the priori and posteriori information of x (including the average value and variance).

More specifically, x is modeled to be a Gaussian random variable, and by taking the priori average value $\vec{X}$ and the priori covariance matrix $\vec{V}$ of x as known quantity, the posteriori information of x can be obtained based on the MMSE estimation algorithm using following formulas (4)

and (5), that is, the posteriori average value $\bar{x}$ and the posteriori covariance matrix $\bar{V}$ of x are:

$$\bar{x} = \vec{x} + (\vec{V}^{-1} + H^H C_z^{-1} H)^{-1} H^H C_z^{-1} (y - H\vec{x}), \quad (4)$$

$$\bar{V} = (H^H C_z^{-1} H + \vec{V}^{-1})^{-1}, \quad (5)$$

Where $C_z$ is the covariance matrix of noise z, and the (i, j)-th element of $H^H$ represents the conjugate of the (i, j)-th element of H.

Then, based on the priori information ($\vec{x}$ and $\vec{V}$) and posteriori information ($\bar{x}$ and $\bar{V}$) of x, the extrinsic information of all the elements in x can be obtained using following formulas (6) and (7):

$$v_e(n) = \left[ \frac{1}{\bar{V}(n,n)} - \frac{1}{\vec{V}(n,n)} \right]^{-1}, \quad (6)$$

$$x_e(n) = v_e(n) \left[ \frac{\bar{x}(n)}{\bar{V}(n,n)} - \frac{\vec{x}(n)}{\vec{V}(n,n)} \right], \quad (7)$$

Where $x_e(n)$ and $v_e(n)$ are respectively the extrinsic information average value and covariance of x(n), x(n) represents the n-th element of the vector x, and V(n, n) represents the element in the n-th row and the m-th column in the matrix V.

Then, the extrinsic information of the continuous signal x, as the output of the elementary signal estimator ESE module, is inputted into the forward link of the iterating receiver (as shown in FIG. 8, the forward link is approximately opposite to the transmitting end), to perform de-interleaving, de-spreading and demodulating, and then inputted to the backward link (the backward link is approximately opposite to the transmitting end) to go back to the ESE module, so as to enter the iterative detection process. The detection result is more improved and stable with the increasing of the number of the iterations, and finally $\hat{u}_k$ is decided to obtain the bit error rate performance of the system.

The data transmission rate obtained by using the full spreader proposed in the disclosure is the same as that in the conventional IDMA communication system, and the user-level and sub-carrier-level power distribution solutions are completely applicable to the full spreader proposed by the disclosure.

It is to be noted that, the signal processing system for receiving continuous signals transmitted by user equipments according to the embodiment of the disclosure described above in conjunction with FIGS. 7-8 may be implemented in a base station of the communication system.

According to an embodiment of the disclosure, correspondingly to the signal processing system included by the user equipment located at the transmitting end of the non-orthogonal multiple access communication system, it is further provided a signal processing method.

Figure 9:
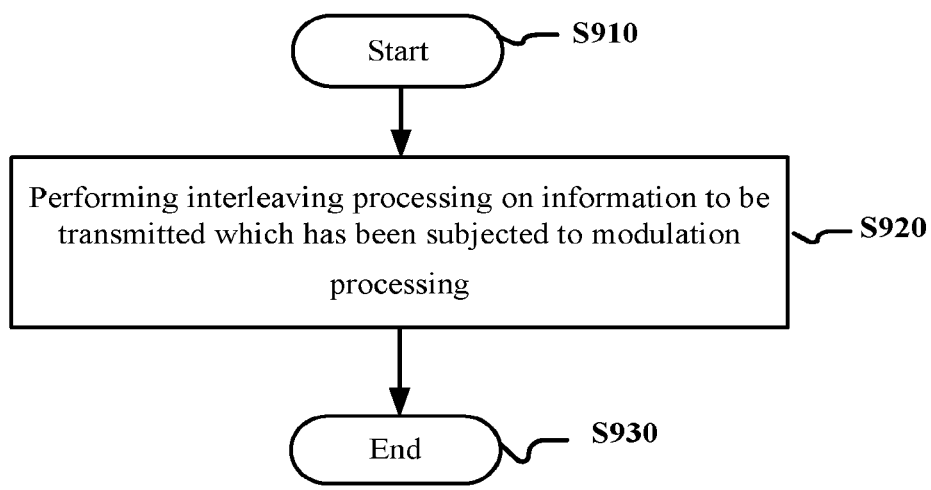
FIG. 9 is a schematic flowchart showing a signal processing method according to an embodiment of the disclosure.

FIG. 9 is a schematic flowchart showing a signal processing method according to an embodiment of the disclosure. As shown in FIG. 9, in step S920, interleaving processing is performed on information to be transmitted which has been subjected to modulation processing. For S920, reference may be made to the operations of the signal processing system described in conjunction with FIGS. 2-3 and 5-6, detail description of which will be omitted here.

According to an embodiment of the disclosure, correspondingly to the signal processing system included by the base station located at the receiving end of the non-orthogonal multiple access communication system, it is further provided a signal processing method for a non-orthogonal multiple access communication system, for receiving and detecting continuous signals transmitted by multiple user equipments.

Figure 10:
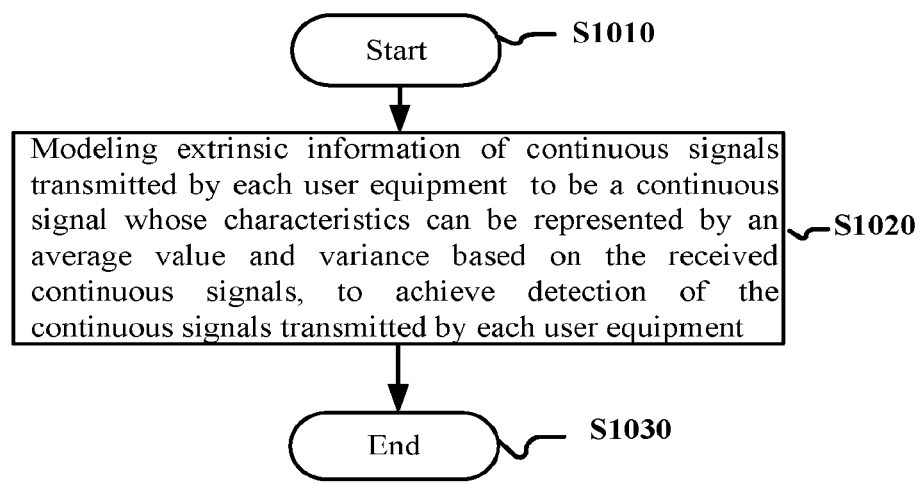
FIG. 10 is a schematic flowchart showing a signal processing method according to another embodiment of the disclosure.

FIG. 10 is a schematic flowchart showing a signal processing method according to an embodiment of the disclosure. As shown in FIG. 10, in step S1020, extrinsic information of the continuous signals transmitted by each user equipment is modulated to be a continuous signal whose characteristics can be represented by an average value and variance based on the received continuous signals, to achieve detection of the continuous signals transmitted by said each user equipment. For S1020, reference may be made to the operations of the signal processing system described in conjunction with FIG. 7-8, detail description of which will be omitted here.

Figure 11:
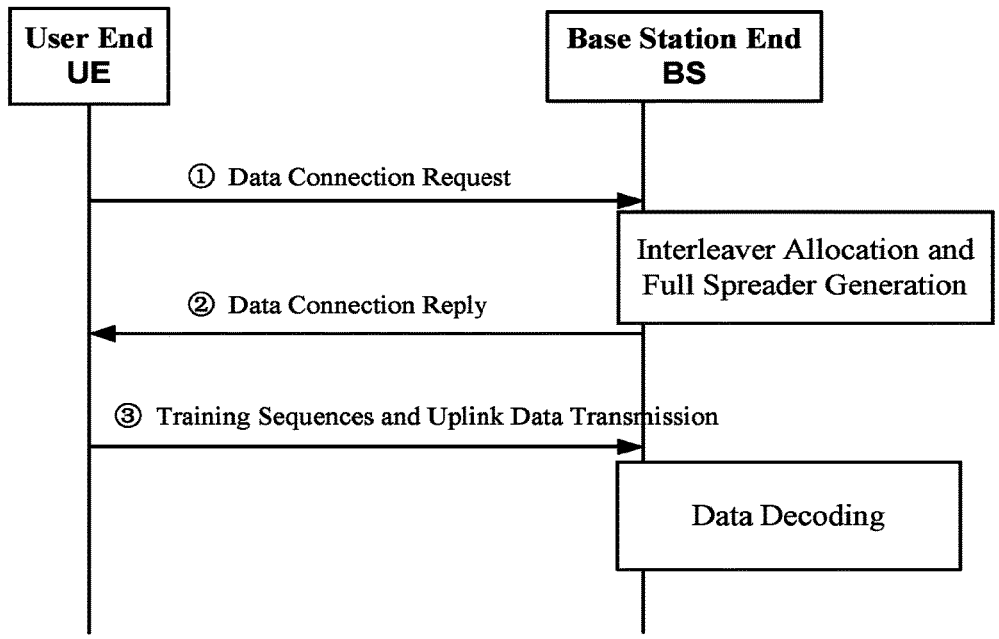
FIG. 11 is a schematic flowchart showing an example of a signal processing method for a non-orthogonal multiple access communication including a base station and a user equipment according to an embodiment of the disclosure.

FIG. 11 is a schematic flowchart showing an example of a signal processing method for a non-orthogonal multiple access communication including a base station and a user equipment according to an embodiment of the disclosure. In this example, the signal processing system using the full spreader as the spreader as shown in FIG. 6 is implemented in the user equipment, and the signal processing system for receiving continuous signals as shown in FIG. 8 is implemented in the base station The example in FIG. 11 takes the time division duplex (TDD) uplink data transmission system as an example, the signaling process performed between the user equipment UE at the user end and the base station BS of the system is as follow.

In step ①, the user equipment located at the user end initiates a data connection request. In step ②, in response to the data connection request transmitted by the user equipment, with respect to each user equipment, the base station generates, after accepting the data connection request, information of a spread sequence (for example the full spreading matrix, but is not limited thereto) with a length longer than a predetermined threshold and transmits the information of the spread sequence and a reply request to the user equipment. For example, the base station generates, after accepting the data connection request, the full spreader and allocates a different interleaver to a different user equipment, and transmits the information of the full spreader and the interleaver and a reply request to the user equipment. In step ③, after receiving the information of the spread sequence from the base station, the user equipment transmits training sequences together with uplink data to the base station. For example, after receiving the information of the full spreader and the interleaver, the user equipment performs spreading and interleaving process on the information to be transmitted and transmits information to be transmitted which has subjected to the spreading and interleaving process as uplink data together with training sequences to the base station.

In the above signaling interaction, most of the signaling data refers only a little amount of data, and may be transmitted via the control channel; only the amount of the training sequences and the data block is large and may be transmitted via the data channel.

According to the disclosure, the training sequences are obtained by the information of the interleaver transmitted by the base station to respective user equipments.

According to the disclosure, the training sequences transmitted by the user equipment to the base station include demodulation reference signals (DMRS) for channel estimation and sounding reference signals (SRS) for dynamical scheduling. Due to the non-orthogonality of the interleaving multiple access communication system, DMRS and SRS of different user overlaps in frequency domain, which is different from LTE, and thus generation of DMRS and SRS should be taken into consideration again. Specific generation steps of DMRS and SRS of the IDMA communication system are as follows.

Figure 12:
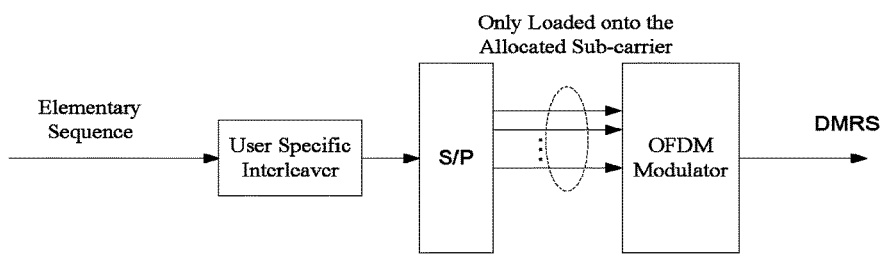
FIG. 12 and FIG. 13 respectively show schematic diagrams of a generating process of a demodulation reference signal and a sounding reference signal in an interleave division multiple access system.

For DMRS, as shown in FIG. 12, an elementary sequence (such as a QPSK modulation sequence with a constant power value) is generated firstly, which has a length same as that of the slice that is obtained by spreading the user data by the full spreader. Then the elementary is inputted into a user specific interleaver to obtain the interleaving sequence. And finally, the interleaving sequence is inputted onto sub-carriers allocated to respective users to perform OFDM modulation, so as to generate the DMRS sequence.

Figure 13:
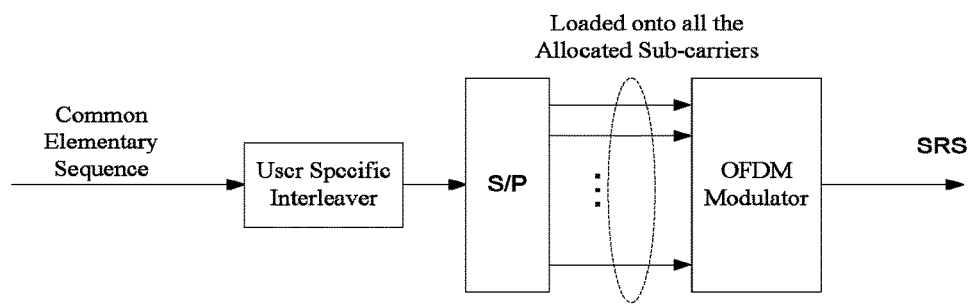

For SRS, as shown in FIG. 13, SRS includes the orthogonal SRS and the non-orthogonal SRS. The IDMA is taken as a special case which having only one resource block in the LTE, with the SRS generation method in the LTE and without any resource scheduling, the orthogonal SRS is generated. As for the non-orthogonal SRS, as shown in FIG. 12, a common elementary sequence is inputted into the interleaver, and the interleaving sequence is inputted to the whole frequency band used by the user for performing OFDM modulation, so as to generate the time-domain SRS sequence.

It is easy to understand that, the communication system including the base station capable of dynamically adjusting the sub-carrier power of the user equipment according to the above embodiment of the disclosure and the user equipment capable of dynamically adjusting the sub-carrier power of the user equipment should also be deemed as being included in the scope of protection of the disclosure.

Figure 14:
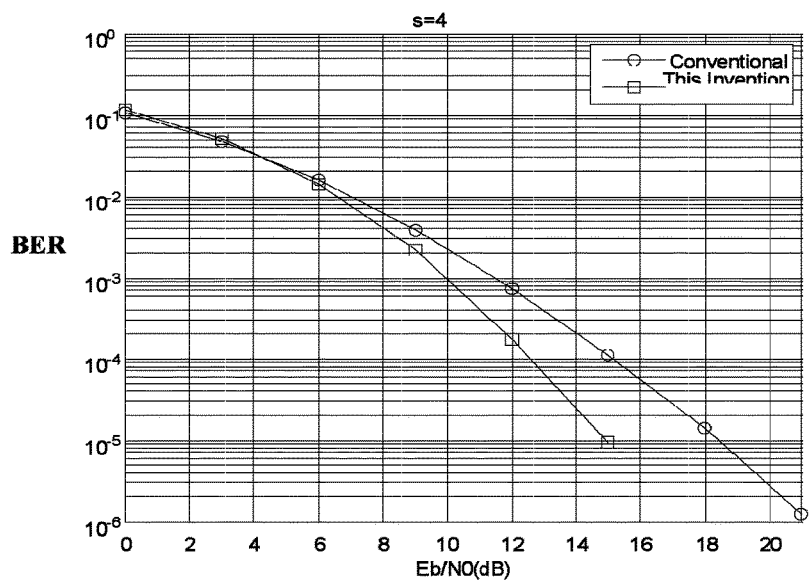
FIG. 14 is a comparison diagram of bit error rates (BER) in a specific configuration of a device and method according to an embodiment of the disclosure and in a technical solution in the conventional art.

FIG. 14 is a comparison diagram of bit error rates in a specific configuration of a communication method according to the disclosure and in a technical solution in the conventional art. In this simulation experiment, the communication transmitting end (i.e., the transmitting end of the user equipment) as shown in FIG. 6 and the communication receiving end (i.e., the receiving end of the base station) as shown in FIG. 8 are adopted, and the signaling process is shown in FIG. 11. Related parameters of the system are as follows. The spreading length S=4, the number of the active user equipments K=1, the number of the sub-carriers N=128, each user equipment adopts the random interleaver and the partial DFT spreading matrix, the constellation diagram is QPSK modulation, the channel is the 6-tap Rayleigh fading channel, the receiver adopts the ZF (zero forcing) equalization technology, and the iteration number is 1, FIG. 13 shows a corresponding bit error rate (BER) curve of the system, including the BER result of the conventional IDMA system (the curve is denoted as "conventional") and the BER result of the non-orthogonal multiple access communication system according to the disclosure (the curve is denoted as "disclosure"). As can be seen from FIG. 14, in the case of a single user, the BER performance obtained by the signal processing system with the full spreader according to the disclosure is better than that obtained by the conventional DMA system, and as the signal noise ratio increases, the performance gain is more significant, it is because the signal processing system with the full spreader according to the disclosure can spread the user bit information fully, thereby effectively reducing the signal distortion caused by the channel frequency selectivity.

Figure 15:
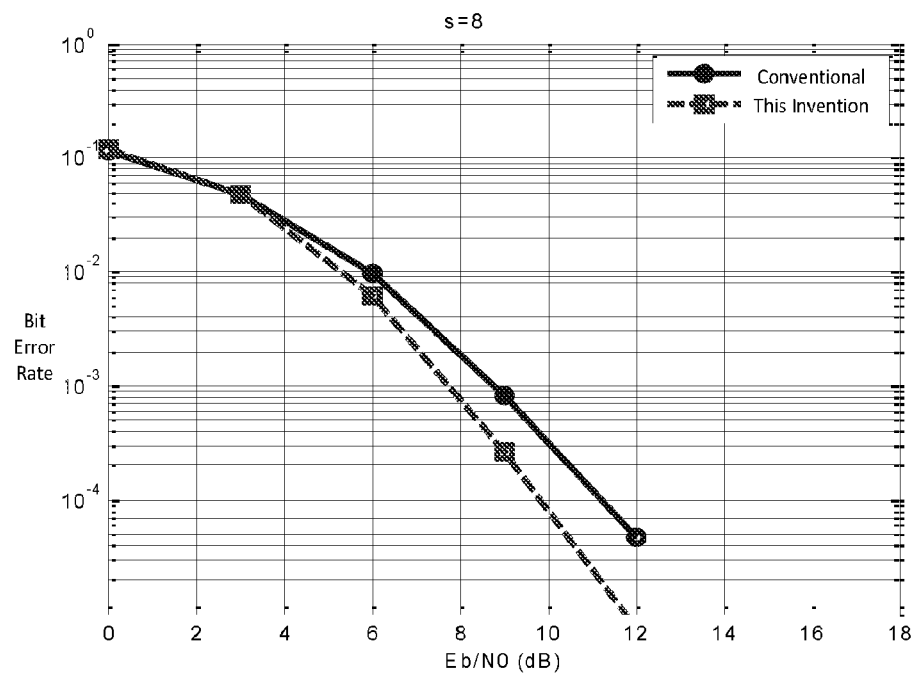
FIG. 15 is a comparison diagram of bit error rates in another specific configuration of a device and method according to an embodiment of the disclosure and in a technical solution in the conventional art.

FIG. 15 is another comparison diagram of bit error rates in a specific configuration of a communication method according to the disclosure and in a technical solution in the conventional art. In this simulation experiment, the communication transmitting end (i.e., the transmitting end of the user equipment) as shown in FIG. 6 and the communication receiving end (i.e., the receiving end of the base station) as shown in FIG. 8 are adopted, and the signaling process is shown in FIG. 11. Related parameters of the system are as follows. The spreading length S=8, the number of the active user equipments K=4, the number of the sub-carriers N=128, each user equipment adopts the random interleaver and the partial DFT spreading matrix, the constellation diagram is QPSK modulation, the channel is the 16-tap Rayleigh fading channel, the receiver adopts the Gaussian modeling algorithm according to the disclosure, and the iteration number is 8, FIG. 15 shows a corresponding BER curve of the system, including the BER result of the conventional IDMA system (the curve is denoted as "conventional") and the BER result of the non-orthogonal multiple access communication system according to the disclosure (the curve is denoted as "disclosure"). As can be seen from FIG. 15, in the case of multiple users, the BER performance obtained by the signal processing system with the full spreader and the detection algorithm according to the disclosure is better than that obtained by the conventional IDMA system, it is because the signal processing system with the full spreader according to the disclosure can spread the user bit information fully, thereby effectively reducing the signal distortion caused by the channel frequency selectivity, and the user information bit transmitted by the signal processing system with the full spreader according to the disclosure is decoded using the continuous signal modeling.

The signal processing system according to the disclosure can at least achieve one of the following beneficial effects: capable of saving length of an interleaver by providing the symbol mapping device ahead of the interleaver, and capable of obtaining more diversity gain by performing the spreading operation using the full spreader using the full spreading matrix.

Application Example

The technique according to the disclosure is applicable to various products. For example, the signal processing system according to the disclosure may be implemented as any type of server, such as a tower server, a rack server and a blade server. The signal processing system according to the disclosure may be a control module (such as a integrated circuit module including a single dice, and a card or blade inserted into the slot of the blade server) mounted on the server.

For example, the base station according to the disclosure may be implemented as any type of evolved node B (eNB), such as a macro eNB and a small eNB. The small eNB may be an eNB which covers a cell smaller than a macro cell, such as a pico eNB, a micro eNB and a home (femto) eNB. Alternatively, the base station according to the disclosure may be implemented as any other type of base station, such as NodeB and a base station transceiver (BTS). The base station may include: a main body (also referred to as a base station equipment) configured to control the radio communication, and one or more remote radio header (RRH) provided at a different point from the main body. Further, the various types of terminals described hereinafter may serve as a base station by performing the base station function temporarily or semi-permanently.

For example, the user equipment according to the disclosure may be implemented as a mobile terminal (such as a smart phone, a panel personal computer (PC), a notebook PC, a portable game terminal, a portable/softdog mobile router and a digital camera) or an automobile-mounted terminal (such as a car navigation device). The terminal device 300 may also be implemented as a terminal for performing machine to machine (M2M) communication (which is also referred to as a machine-type communication (MTC) terminal). Further, the terminal device according to the disclosure may be a radio communication module mounted on each of the above terminals (such as the integrated circuit module including a single dice).

[An Application Example of a Signal Processing System]

Figure 16:
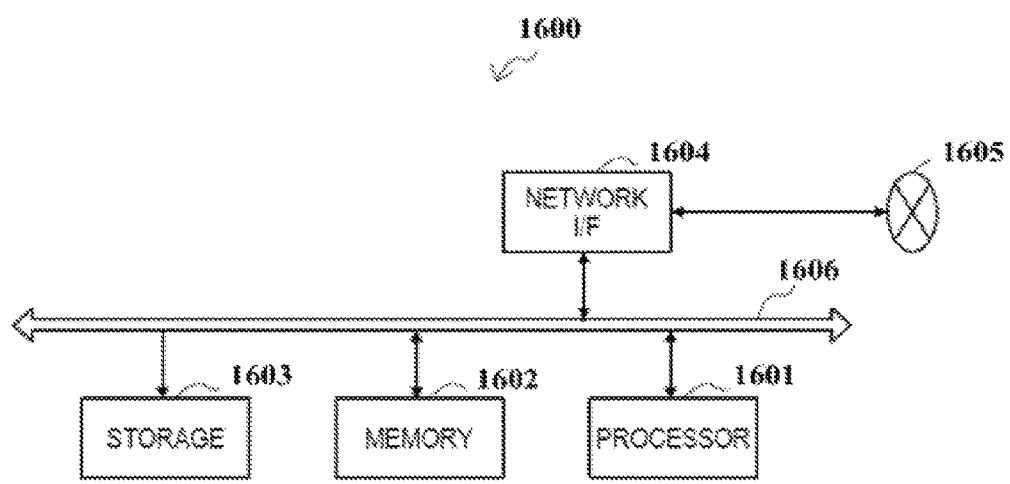
FIG. 16 is a block diagram showing an example of a schematic configuration of a server.

FIG. 16 is a block diagram showing an example of a schematic configuration of a server 1600 in which the technique of the disclosure can be applied. The server 1600 includes a processor 1601, a memory 1602, a storage 1603, a network interface 1604 and a bus 1606.

The processor 1601 may be for example the central processing unit (CPU) or the digital signal processor (DSP), and control the function of the server 1600. The memory 1602 includes a random access memory (RAM) and a read-only memory (ROM), and stores the data and the program to be performed by the processor 1601. The storage 1603 may include a storage medium, such as a semiconductor memory and a hard disk.

The network interface 1604 is a wired communication interface for connecting the server 1600 to the wired communication network 1605. The wired communication network 1605 may be a core network (EPC) such as an evolved package core network or a packet data network (PDN) such as an Internet.

The bus 1606 connects the processor 1601, the memory 1602, the storage 1603 and the network interface 1604. The bus 1606 may include two or more buses with respective rates (such as high-speed bus and low-speed bus).

In the server 1600 as shown in FIG. 16, the signal processing system described using FIGS. 2-3 and 5-8 may be implemented by the processor 1601.

[An Application Example of a Base Station]

(First Application Example)

Figure 17:
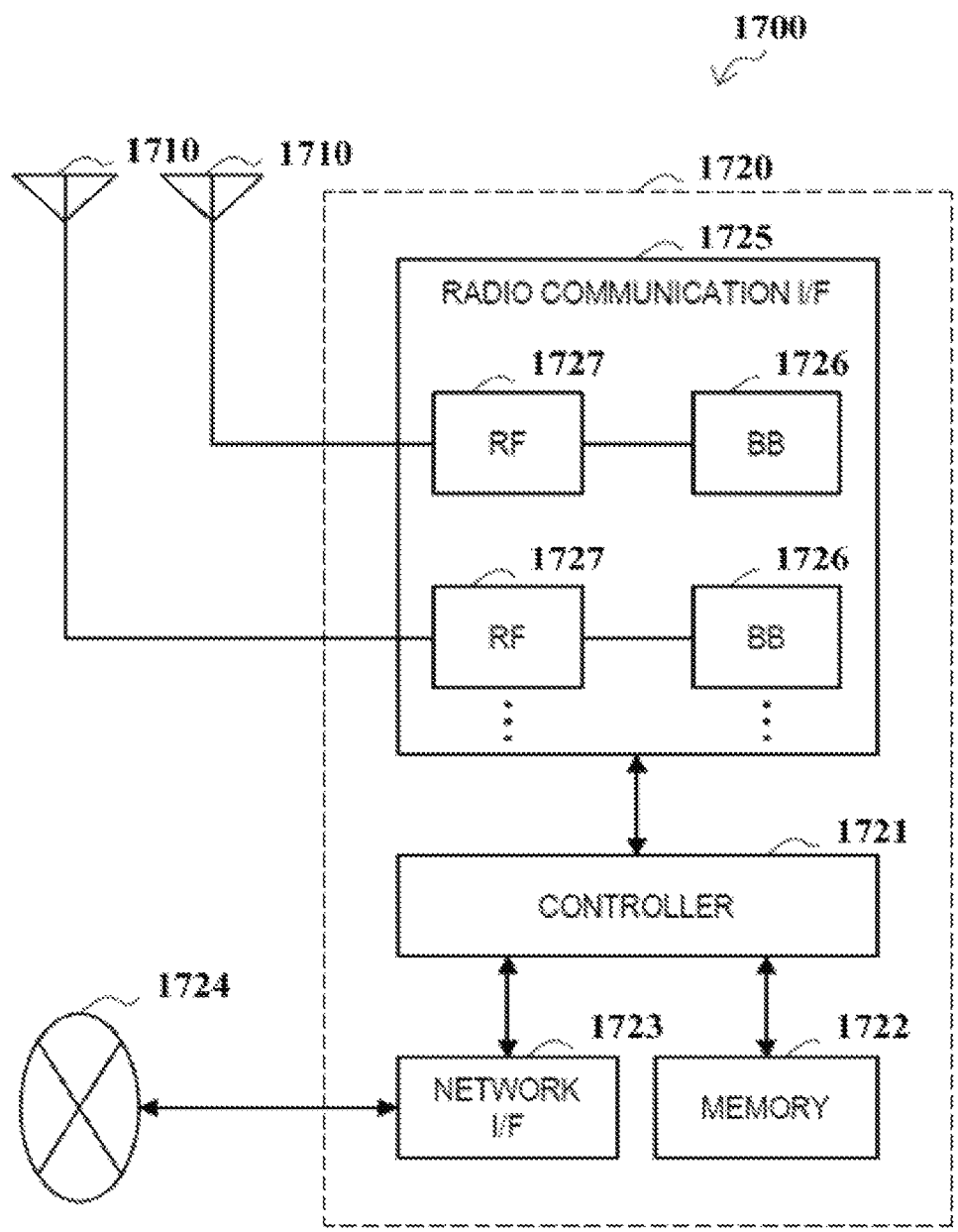
FIG. 17 is a block diagram showing a first example of a schematic configuration of an eNB.

FIG. 17 is a block diagram showing a first example of a schematic configuration of an eNB in which the technique of the disclosure can be applied. The eNB 1700 includes one or more antennas 1710 and a base station device 1720. The base station device 1720 and each of the antennas 1710 may be connected via a RF cable.

Each of the antennas 1710 includes one or more antenna element (such as the multiple antenna elements included in the multiple-input multiple-output (MIMO) antenna), and is used for transmitting and receiving the wireless signal by the base station device 1720. As shown in FIG. 17, the eNB 1700 may include multiple antennas 1710. For example, the multiple antennas 1710 may compatible with the multiple frequency bands used by the eNB 1700. Although the eNB 1700 including multiple antennas 1710 is shown in FIG. 17, the eNB 1700 may include a single antenna 1710.

The base station device 1720 includes a controller 1721, a memory 1722, a network interface 1723 and a radio communication interface 1725.

The controller 1721 may be for example a CPU or DSP, and operate various functions of higher levels of the base station device 1720. For example, the controller 1721 generates a data packet based on the data in the signal processed by the radio communication interface 1725, and passes the generated packet via the network interface 1723. The controller 1721 may bundle data from multiple base band processors to generate the bundled data, and pass the generated bundled data. The controller 1721 may have the logical function to perform the following control: the control is such as wireless resource control, wireless carrying control, mobility management, admission control and scheduling. The control may be performed in conjunction with the neighbor eNB or core network node. The memory 1722 includes RAM and ROM, and stores the program to be performed by the controller 1721 and various types of control data (such as a terminal list, transmission power data and scheduling data).

The network interface 1723 is a communication interface for connecting the base station device 1720 to the core network 1724. The controller 1721 may communicate with the core network node or another eNB via the network interface 1723. In this case, the eNB 1700 and the core network node or other eNB may be connected via a logic interface (such as S1 interface and X2 interface). The network interface 1723 may also be a wired communication interface or a radio communication interface for wireless backhaul routing. If the network interface 1723 is a radio communication interface, the network interface 823 may user a higher frequency band for radio communication as compared with that used by the radio communication interface 1725.

The radio communication interface 1725 supports any cellular communication scheme (such as the long term evolution (LTE) and the LTE-advanced), and provides a wireless connection to a terminal located in the cell of the eNB 1700 via the antenna 1710. The radio communication interface 1725 may generally include for example a base band (BB) processor 1726 and a RF circuit 1727. The BB processor 1726 may perform for example coding/decoding, modulation/demodulation and multiplexing/de-multiplexing, and perform various types of signal processes of the layer (for example L1, medium access control (MAC), wireless link control (RLC) and packet data convergence protocol (PDCP)). Instead of the controller 1721, the BB processor 1726 may have some or all of the above logical functions. The BB processor 1726 may be a memory storing the communication control program, or a module including a processor and related circuit configured to perform the program. The updating program may change the function of the BB processor 1726. The module may be a card or blade inserted into the slot of the base station device 1720. Alternatively, the module may be a chip mounted on the card or the blade. The RF circuit 1727 may include for example a mixer, a filter and an amplifier, and transmit and receive the wireless signal via the antenna 1710.

As shown in FIG. 17, the radio communication interface 1725 may include multiple BB processors 1726. For example, the multiple BB processors 1726 may compatible with the multiple frequency bands used by the eNB 1700. As shown in FIG. 17, the radio communication interface 1725 may include multiple RF circuits 1727. For example, the multiple RF circuits 1727 may compatible with multiple antenna elements. Although an example in which the radio communication interface 1725 including multiple BB processors 1726 and multiple RF circuits 1727 is shown in FIG. 17, the radio communication interface 1725 may include a single BB processor 1726 and a single RF circuit 1727.

(Second Application Example)

Figure 18:
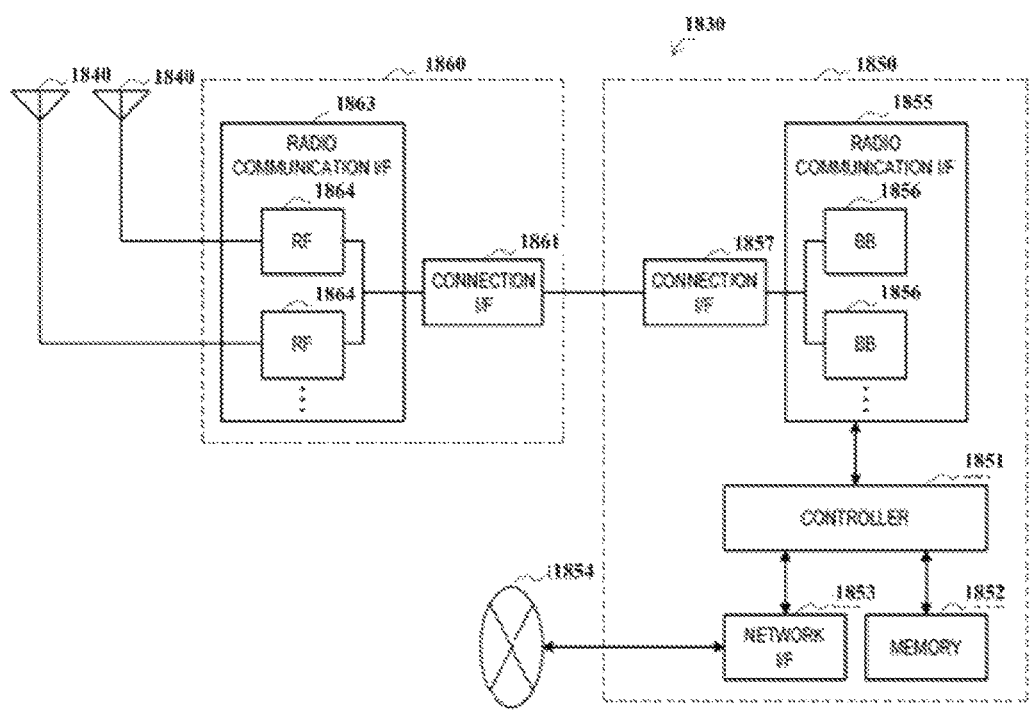
FIG. 18 is a block diagram showing a second example of a schematic configuration of an eNB.

FIG. 18 is a block diagram showing a second example of a schematic configuration of an eNB in which the technique of the disclosure can be applied. The eNB 1830 includes one or more antennas 1840, a base station device 1850 and a RRH 1860. The RRH 1860 and each of the antennas 1840 may be connected via a RF cable. The base station device 1850 and the RRH 1860 may be connected via a high-speed wire, such as a fiber cable.

Each of the antennas 1840 includes one or more antenna element (such as the multiple antenna elements included in the MIMO antenna), and is used for transmitting and receiving the wireless signal by the RRH 1860. As shown in FIG. 18, the eNB 1830 may include multiple antennas 1840. For example, the multiple antennas 1840 may compatible with the multiple frequency bands used by the eNB 1830. Although the eNB 1830 including multiple antennas 1840 is shown in FIG. 18, the eNB 1830 may include a single antenna 1840.

The base station device 1850 includes a controller 1851, a memory 1852, a network interface 1853, a radio communication interface 1855 and a connection interface 1857. The controller 1851, the memory 1852 and the network interface 1853 are respectively the same as the controller 1721, the memory 1722 and the network interface 1723 described referring to FIG. 17.

The radio communication interface 1855 supports any cellular communication scheme (such as the LTE and the LTE-advanced), and provides a wireless connection to a terminal located in the a sector corresponding to the RRH 1860 via the RRH 1860 and the antenna 1840. The radio communication interface 1855 may generally include for example a base band (BB) processor 1856. Except for the BB processor 1856 being connected to the RF circuit 1864 of the RRH 1860 via the connection interface 1857, the BB processor 1856 is the same as the BB processor 1726 described referring to FIG. 17. As shown in FIG. 18, the radio communication interface 1855 may include multiple BB processors 1856. For example, the multiple BB processors 1856 may compatible with the multiple frequency bands used by the eNB 1830. Although an example in which the radio communication interface 1855 including multiple BB processors 1856 is shown in FIG. 18, the radio communication interface 1855 may include a single BB processor 1856.

The connection interface 1857 is an interface for connecting the base station device 1850 (the radio communication interface 1855) to the RRH 1860. The connection interface 1857 may also be a communication module in the high-speed wire for connecting the base station device 1850 (the radio communication interface 1855) to the RRH 1860.

The RRH 1860 includes a connection interface 1861 and a radio communication interface 1863.

The connection interface 1861 is an interface for connecting the RRH 1860 (the radio communication interface 1863) to the base station device 1850 The connection interface 1861 may also be a communication module in the high-speed wire.

The radio communication interface 1863 transmits and receives the wireless signal via the antenna 1840. The radio communication interface 1863 may generally include for example a RF circuit 1864. The RF circuit 1864 may include for example a mixer, a filter and an amplifier, and transmit and receive the wireless signal via the antenna 1840. As shown in FIG. 18, the radio communication interface 1863 may include multiple RF circuits 1864. For example, the multiple RF circuits 1864 may support multiple antenna elements. Although an example in which the radio communication interface 1863 including multiple RF circuits 1864 is shown in FIG. 18, the radio communication interface 1863 may include a single RF circuit 1864.

In the eNB 1700 and eNB 1830 shown in FIG. 17 and FIG. 18, the signal processing system described referring to FIGS. 7-8 may be implemented using the radio communication interface 1725 and the radio communication interface 1863. At least some of the functions may be implemented by the controller 1821 and the controller 1851.

[An Application Example of a Terminal Device]

(A First Application Example)

Figure 19:
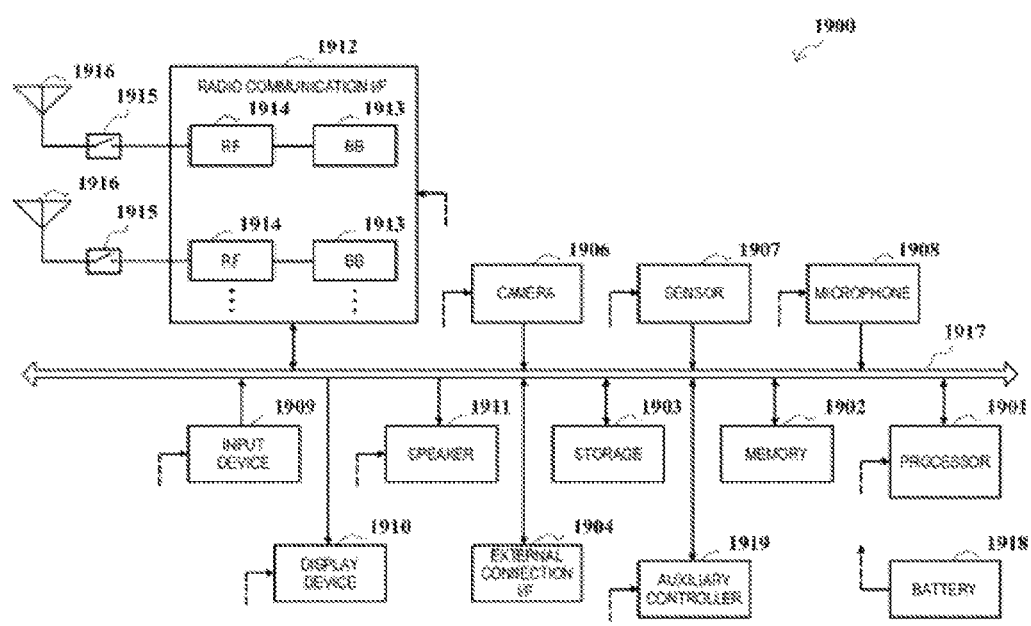
FIG. 19 is a block diagram showing an example of a schematic configuration of an smart phone.

FIG. 19 is a block diagram showing an example of a schematic configuration of a smart phone 1900 in which the technique of the disclosure can be applied. The smart phone 1900 includes a processor 1901, a memory 1902, a storage 1903, an external connection interface 1904, a camera 1906, a sensor 1907, a microphone 1908, an input device 1909, a display device 1910, a speaker 1911, a radio communication interface 1912, one or more antenna switch 1915, one or more antenna 1916, a bus 1917, a battery 1918 and an auxiliary controller 1919.

The processor 1901 may be for example the CPU or a system on chip (SoC), and control the functions of the application layer and another layer of the smart phone 1900. The memory 1902 includes a RAM and a ROM, and stores the data and the program to be performed by the processor 1901. The storage 1903 may include a storage memory, such as a semiconductor memory and a hard disk. The external connection interface 1904 is an interface for connecting an external device (such as a memory card or a universal serial bus (USB) device) to the smart phone 1900.

The camera 1906 includes an image sensor (such as a charge coupling device (CCD) and a complementary metal oxide semiconductor (CMOS)), and generates a capture image. The sensor 1907 may include a group of sensors, such as a measurement sensor, a gyro sensor, a geomagnetic sensor and an acceleration sensor. The microphone 1908 converts the sound inputted into the smart phone 1900 into an audio signal. The input device 1909 includes for example a touch sensor, a keypad, a keyboard, a button or a switch configured to detect the touch on the screen of the display device 1910, and receives operation or information inputted by the user. The display device 1910 includes a screen (such as the liquid crystal display (LCD) and the organic light emitting diode (OLED)), and displays the output image from the smart phone 1900. The speaker 1911 converts the audio signal outputted from the smart phone 1900 into the sound.

The radio communication interface 1912 supports any cellular communication scheme (such as the LTE and the LTE-advanced), and performs the radio communication. The radio communication interface 1912 may generally include for example a BB processor 1913 and a RF circuit 1914. The BB processor 1913 may perform for example coding/decoding, modulation/demodulation and multiplexing/de-multiplexing, and perform various types of signal processes of the layer. The RF circuit 1914 may include for example a mixer, a filter and an amplifier, and transmit and receive the wireless signal via the antenna 1916. The radio communication interface 1912 may be a chip module on which the BB processor 1913 and the RF circuit 1914 are integrated. As shown in FIG. 19, the radio communication interface 1912 may include multiple BB processors 1913 and multiple RF circuits 1914. Although an example in which the radio communication interface 1912 including multiple BB processors 1913 and multiple RF circuits 1914 is shown in FIG. 19, the radio communication interface 1912 may include a single BB processor 1913 and a single RF circuit 1914.

Further, in addition to the cellular communication scheme, the radio communication interface 1912 may support another type of radio communication scheme, such as short-range radio communication scheme, a near field communication scheme and a wireless local area network (LAN) scheme. In this case, the radio communication interface 1912 may include the BB processor 1913 and the RF circuit 1914 for each radio communication scheme.

Each of the antenna switches 1915 switches the connection destination of the antenna 1916 among the multiple circuits (such as circuits for different radio communication schemes) included in the radio communication interface 1912.

Each of the antennas 1916 includes a single one or multiple antenna element (such as the multiple antenna elements included in the MIMO antenna), and is used for transmitting and receiving the wireless signal by the radio communication interface 1912. As shown in FIG. 19, the smart phone 1900 may include multiple antennas 1916. Although an example in which the smart phone 1900 includes multiple antennas 1916 is shown in FIG. 19, the smart phone 1900 may include a single antenna 1916.

Further, the smart phone 1900 may include the antenna 1916 for each of the radio communication solutions. In this case, the antenna switch 1915 may be omitted from of the configuration of the smart phone 1900.

The bus 1917 is used to connect the processor 1901, the memory 1902, the storage 1903, the external connection interface 1904, the camera 1906, the sensor 1907, the microphone 1908, the input device 1909, the display device 1910, the speaker 1911, the radio communication interface 1912 and an auxiliary controller 1919. The battery 1918 supplies power to respective blocks of the smart phone 1900 shown in FIG. 19 via the feeding line, which is shown as a dashed line in the drawings. The auxiliary controller 1919 operates the minimum necessary function of the smart phone 1900 in the sleep mode for example.

In the smart phone 1900 as shown in FIG. 19, the signal processing system described referring to FIGS. 2-3 and 5-6 may be implemented by the radio communication interface 1912. At least some of the functions may be implemented by the processor 1901 or the auxiliary controller 1919.

(A Second Application Example)

Figure 20:
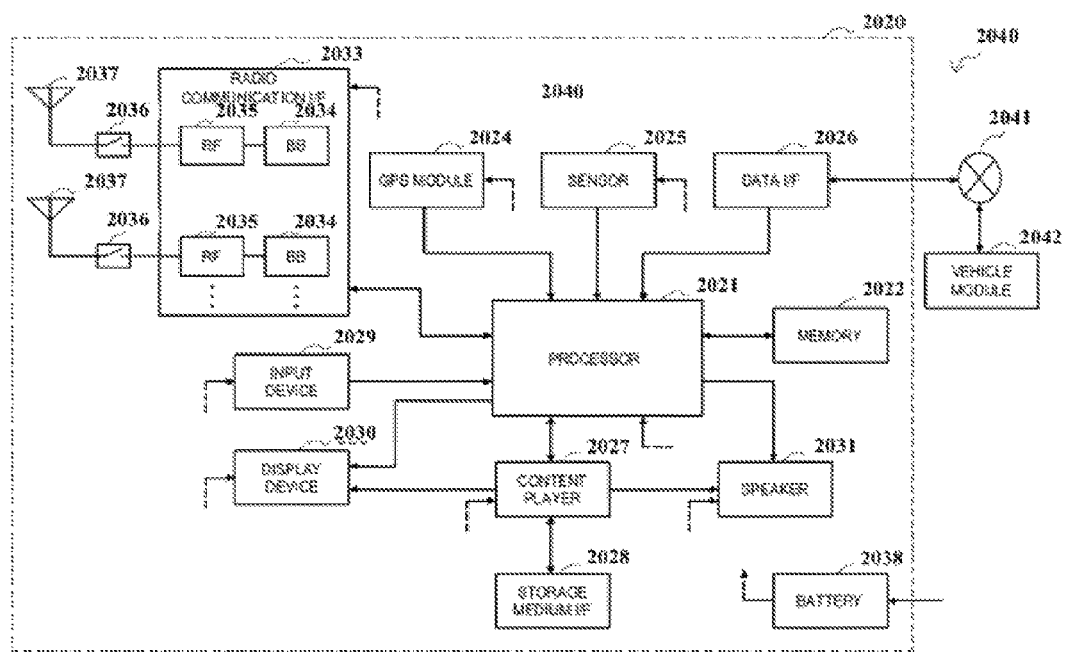
FIG. 20 is a block diagram showing an example of a schematic configuration of a car navigation device.

FIG. 20 is a block diagram showing an example of a schematic configuration of a car navigation device 2020 in which the technique of the disclosure can be applied. The car navigation device 2020 includes a processor 2021, a memory 2022, a global positioning system (GPS) module 2024, a sensor 2025, a data interface 2026, a content player 2027, a storage medium interface 2028, an input device 2029, a display device 2030, a speaker 2031, a radio communication interface 2033, one or more antenna switch 2036, one or more antenna 2037 and a battery 2038.

The processor 2021 may be for example the CPU or the SoC, and control the functions of the application layer and another layer of the car navigation device 2020. The memory 2022 includes a RAM and a ROM, and stores the data and the program to be performed by the processor 2021.

The GPS module 2024 measures the position (such as latitude, longitude and height) of the car navigation device 2020 using the GPS signal received from the GPS satellite. The sensor 2025 may include a group of sensors, such as a gyro sensor, a geomagnetic sensor and an air pressure sensor. The data interface 2026 is connected to the in-vehicle network 2041 via a terminal not shown, and acquires the data generated by the vehicle (such as vehicle speed data).

The content player 2027 reproduces the content stored in the storage medium (such as CD and DVD), and the storage medium is inserted into the storage medium interface 2028. The input device 2029 includes for example a touch sensor, a button or a switch configured to detect the touch on the screen of the display device 2030, and receives the operation or information inputted by the user. The display device 2030 includes a screen such as a LCD or a OLED display, and displays the image of navigation function or the reproduced content. The speaker 2031 outputs the sound of the navigation function or the reproduced content.

The radio communication interface 2033 supports any cellular communication scheme (such as the LTE and the LTE-advanced), and performs the radio communication. The radio communication interface 2033 may generally include for example a BB processor 2034 and a RF circuit 2035. The BB processor 2034 may perform for example coding/decoding, modulation/demodulation and multiplexing/de-multiplexing, and perform various types of signal processes for radio communication. The RF circuit 2035 may include for example a mixer, a filter and an amplifier, and transmit and receive the wireless signal via the antenna 2037. The radio communication interface 2033 may be a chip module on which the BB processor 2034 and the RF circuit 2035 are integrated. As shown in FIG. 20, the radio communication interface 2033 may include multiple BB processors 2034 and multiple RF circuits 2035. Although an example in which the radio communication interface 2033 including multiple BB processors 2034 and multiple RF circuits 2035 is shown in FIG. 19, the radio communication interface 2033 may include a single BB processor 2034 and a single RF circuit 2035.

Further, in addition to the cellular communication scheme, the radio communication interface 2033 may support another type of radio communication scheme, such as short-range radio communication scheme, a near field communication scheme and a wireless LAN scheme. In this case, the radio communication interface 2033 may include the BB processor 2034 and the RF circuit 2035 for each radio communication scheme.

Each of the antenna switches 2036 switches the connection destination of the antenna 2037 among the multiple circuits (such as circuits for different radio communication schemes) included in the radio communication interface 2033.

Each of the antennas 2037 includes a single one or multiple antenna element (such as the multiple antenna elements included in the MIMO antenna), and is used for transmitting and receiving the wireless signal by the radio communication interface 2033. As shown in FIG. 20, the car navigation device 2020 may include multiple antennas 2037. Although an example in which the car navigation device 2020 includes multiple antennas 2037 is shown in FIG. 19, the car navigation device 2020 may include a single antenna 2037.

Further, the car navigation device 2020 may include the antenna 2037 for each of the radio communication solutions. In this case, the antenna switch 2036 may be omitted from of the configuration of the car navigation device 2020.

The battery 2038 supplies power to respective blocks of the car navigation device 2020 shown in FIG. 20 via the feeding line, which is shown as a dashed line in the drawings. The battery 2038 accumulates the power supplied from the vehicle.

In the car navigation device 2020 as shown in FIG. 20, the signal processing system described referring to FIGS. 2-3 and 5-6 may be implemented by the radio communication interface 2033. At least some of the functions may be implemented by the processor 2021.

The technique of the disclosure may also be implemented as a vehicle-mounted system (or vehicle) 2040 including the car navigation device 2020, a vehicle-mounted network 2041 and a vehicle module 2042. The vehicle module 2042 generates the vehicle data (such as vehicle speed, motor speed and fault information), and outputs the generated data to the vehicle-mounted network 2041.

The basic principle of the disclosure has been described in conjunction with the specific embodiments. However, it is to be noted that, those skilled in the art should understand that, all or some of the steps and components of the device and method according to the embodiment of the disclosure may be implemented in hardware, firmware, software or a combination thereof in any computing device (including a processor, a storage medium and the like) or in a network of computing devices, which can be implemented by those skilled in the art by using the basic circuit design knowledge or the basic programming techniques upon reading the description of the disclosure.

It is to be understood by those skilled in the art that the various integral components of the above device, for example the optimization model establishing sub-unit, the parameter determining sub-unit, the power determining sub-unit and the like, may be implemented by one or more processor, and the communication device may be implemented by the circuit devices such as the antenna, the filter, the modulator/demodulator and the coder/decoder.

Further, it is further provided a program product in which the machine readable instruction code is stored in the disclosure. The instruction code, when read and executed by the machine, performs the method according to the embodiment of the disclosure.

Accordingly, the storage medium for carrying the program product in which the machine readable instruction code is stored is also included in the disclosure. The storage medium includes, but is not limited to, soft disk, optical disk, magnetic optical disk, memory card, memory stick and the like.

Figure 21:
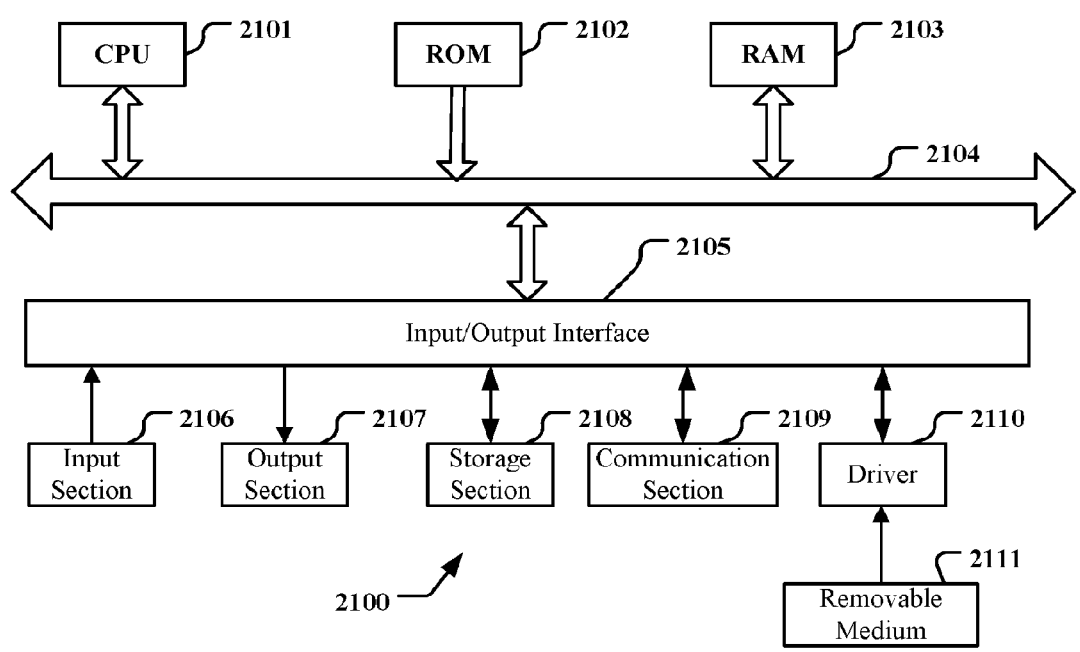
FIG. 21 is a block diagram of an exemplarily structure of a common personal computer in which a device and/or method and/or system according to an embodiment of the disclosure can be implemented.

In a case of implementation in software or firmware, the program consisting of the software is mounted to the computer with a dedicated hardware structure (such as the common computer 2100 as shown in FIG. 21) from the storage medium or network. The computer, when being mounted with the various programs, performs various functions.

In FIG. 21, the central processing unit (CPU) 2101 performs various functions according to the program stored in the read-only memory (ROM) 2102 or the program loaded onto the random access memory (RAM) 2103 from the storage part 2108. In the RAM 2103, the data required by the CPU 2101 for performing the various processes is stored. The CPU 2101, the ROM 2102 and the RAM 2103 are connected via the bus 2104. The input/output interface 2105 is also connected to the bus 2104.

The following components are connected to the input/output interface 2105: the input part 2106 (including the keyboard, the mouse and the like), the output part 2107 (including the displayer (such as the Cathode Ray Tube (CRT) and the liquid crystal display (LCD)), the speaker and the like), the storage part 2108 (including the hard disk and the like), and the communication part 2109 (including the network interface card, such as LAN card and modem). The communication part 2109 performs the communication process via the network, such as the Internet. As required, the driver 2110 may be connected to the input/output interface 2105. The removable medium 2111, such as magnetic disk, optical disk, magnetic optical disk and semiconductor memory, may be mounted on the driver 2110 as required, so that the computer program read therefrom is mounted onto the storage part 2108.

In the case of implementation in software, the program consisting of the software is mounted from the network, such as the Internet, or from the storage medium, such as the removable medium 2111.

It is to be understood by those skilled in the art that, this storage medium is different from the removable medium 2111 as shown in FIG. 21 in which the program is stored and which is distributed separately from the device to provide the program for the user. The example of the removable medium 2111 includes magnetic disk (including soft disk (registered trademark)), optical disk (including compact disk-read only memory (CD-ROM) and Digital Video Disk (DVD)), magnetic optical disk (including mini disk (MD) (registered trademark)), and semiconductor memory. Alternatively, the storage medium may be the ROM 2012, the hard disk contained in the storage part 2018, and the like, in which the program is stored and which is distributed to the user together with the device in which it is contained.

It is further to be noted that, in the device, method and system according to the disclosure, the various steps or steps can be decomposed and/or recombined. These decomposition and/or recombination should be deemed as the equivalent solution of the disclosure. The steps for performing the above processes may be executed naturally in the description order in a chronological order, but is not necessarily to be executed in the chronological order. Some of the steps may be executed in parallel or separately.

Finally, it is to be noted that, terms of "include", "comprise" or any other variants are intended to be non-exclusive. Therefore, a process, method, article or device including multiple elements includes not only the disclosed elements but also other elements that are not clearly enumerated, or also include inherent elements of the process, method, article or device. Unless expressively limited otherwise, the statement "including a . . . " does not exclude the case that other similar elements may exist in the process, method, article or device other than enumerated elements.

Although the embodiments of the disclosure are introduced in detail above in conjunction with the drawings, the described embodiments are only to describe the disclosure but not to limit the disclosure. In addition, those skilled in the art may make changes to the specific embodiments and the application scope based on the above embodiments. Thus, the scope of the disclosure is only defined by the appended claims and its equivalents.

The invention claimed is:

1. A signal processing system for a non-orthogonal multiple access communication system, the signal processing system being configured to perform interleaving processing on information to be transmitted which has been subjected to modulation processing, the system comprising:
    circuitry configured to
        spread the information to be transmitted,
        perform modulation processing on the spread information,
        perform interleaving processing on the modulated information,
        spread the information to be transmitted using a spread sequence with a length longer than a predetermined threshold, and using a full spreader, the full spreader spreading each information bit into more than one symbol to create a full spread matrix of symbols to obtain a more diverse gain, and
        make the spread sequence overlapping such that an effective spread spectrum length is increased.

2. The signal processing system according to claim 1, wherein the non-orthogonal multiple access communication system is an interleaving multiple access communication system.

3. A user equipment for a non-orthogonal multiple access communication system, wherein the user equipment comprises the signal processing system according to claim 1.

4. A base station for a non-orthogonal multiple access communication system, the base station comprising:
   circuitry configured to, upon receipt of a data connection request from a user equipment,
   generate information of a spread sequence with a length longer than a predetermined threshold,
   spread each information bit into more than one symbol to create a full spread matrix of symbols to obtain a more diverse gain,
   transmit the information of the spread sequence to the user equipment, so that the user equipment spreads information to be transmitted using the spread sequence, and makes the spread sequence overlapping such that an effective spread spectrum length is increased,
   receive uplink data together with a training sequence signal, the uplink data having been processed by an ordered sequence of spreading, modulating and interleaving the uplink data by a user equipment, and
   perform data decoding based on the received uplink data and the training sequences.

5. A signal processing method for a non-orthogonal multiple access communication system, comprising:
   spreading information to be transmitted;
   performing modulation processing on the spread information; and
   performing interleaving processing on the modulated information;
   spreading the information to be transmitted using a spread sequence with a length longer than a predetermined threshold, and using a full spreader, the full spreader spreading each information bit into more than one symbol to create a full spread matrix of symbols to obtain a more diverse gain; and
   making the spread sequence overlapping such that an effective spread spectrum length is increased.

6. A signal processing method for a non-orthogonal multiple access communication system, comprising:
   transmitting, by a user equipment, a data connection request to a base station;
   in response to the data connection request transmitted by the user equipment, with respect to each user equipment, generating information of a spread sequence with a length longer than a predetermined threshold and information of an interleaver allocation associated with the user equipment, spreading each information bit into more than one symbol to create a full spread matrix of symbols to obtain a more diverse gain, and transmitting the information of the spread sequence and a reply request to the user equipment, by the base station; and
   after receiving the information of the spread sequence and the interleaver allocation from the base station, processing information to be transmitted and transmitting, by the user equipment, the information to be transmitted as uplink data together with training sequences to the base station, the processing including spreading the information to be transmitted, performing modulation processing on the spread information, and performing interleaving processing on the modulated information based on the received interleaver allocation information from the base station;
   wherein the user equipment spreads the information to be transmitted using the spread sequence, and makes the spread sequence overlapping such that an effective spread spectrum length is increased.

7. The signal processing method according to claim 6, wherein the training sequence comprises a demodulation reference signal for channel estimation and a sounding reference signal for dynamical scheduling.

8. The signal processing method according to claim 6, wherein the training sequence is obtained by using information of an interleaver transmitted to each user equipment from the base station.

* * * * *